Nov. 3, 1970          J. JULLIEN-DAVIN          3,538,296
TIGHT MOTION TRANSMITTING SYSTEM THROUGH
A THIN METAL MEMBRANE
Filed July 29, 1968

United States Patent Office 3,538,296
Patented Nov. 3, 1970

3,538,296
TIGHT MOTION TRANSMITTING SYSTEM THROUGH A THIN METAL MEMBRANE
Jean Jullien-Davin, Valence, France, assignor to Crouzet, Paris, France, a French company
Filed July 29, 1968, Ser. No. 748,435
Claims priority, application France, July 31, 1967, 116,392
Int. Cl. B23k *11/02*
U.S. Cl. 219—105                        3 Claims

ABSTRACT OF THE DISCLOSURE

Tight motion transmitting device through a thin metal membrane comprising a metal transmitting motion member passing across an aperture in the inflexion area of the membrane, wherein said transmitting motion member is a body of revolution substantially cylindrical the diameter of which is notably greater than the diameter of the membrane aperture and showing, in the crossing area of said membrane a circular cut enclosing the bordering area of the said aperture the bordering area of which is drowned into the constitutive metal of the transmitting organ.

---

The present invention relates to a tight transmission of motion through a thin metal membrane, this transmission of motion being available, for instance, for hermetical microswitches and other similar devices.

Difficulties which occur when achieving such transmissions are known, in which are to obtain:

The absolute tightness of an enclosure containing an inert pressurized gas, the diffusing power of which is sometimes very high;

The longevity of a very thin metal membrane resilient qualities of which must in no case be deteriorated by the excessive heat of a weld;

The resistance to the surrounding heat of use which, particularly in aerospatial applications, is incompatible with the use of low melting point metal filler welds.

In order to get a tight connection between a thin metal membrane and a metal box containing a switch device, electrical resistance weldings have been realized through rotatable knurled nuts electrodes permitting to obtain the absolute tightness, a good resistance at high temperatures of use (owing to the autogenous electrical welding of metals having a high melting point), and a good mechanical longevity since resilient qualities of the membrane are not deteriorated by extended overheating.

On the other hand, it has not been possible to obtain the same results in the crossing of a transmitting motion member through the middle area of a thin metal membrane.

The object of the present invention is to realize this crossing in a quite satisfactory manner, technologically as well as economically speaking.

This purpose is reached, accordingly to the invention, through a method characterized in that it consists in preparing an aperture in the center of inflexion of the thin metal membrane which must be crossed by a transmitting motion metal member, inserting freely in the said aperture, with a small clearance, a cylindrical axial rod, foreseen on the said metal member, having around the rod, a shoulder intended to engage the external face of the membrane and showing, concentrically to the said rod, an annular recess the volume of which substantially corresponds to the one of the part of the axial rod exceeding the internal face of the membrane, a plane annular collar intended to come in support on the external area of the membrane and finally a rounded edge annular lip intended to come opposite and slightly retreated from the external area of the membrane, in applying, on the free end of the axial rod, the plane surface of a counter-piece made of same metal that the metallic transmitting member, then axially pressing the metal transmitting member and the counterpiece between the electrodes of an electrical resistance welding machine, so that the plane surface of the counterpiece be soldered to the axial rod and extrudes, due to the combined action of pressure and heat, the metal, turned pasty, from the said axial rod and from the area located around the aperture made in the membrane, inside of the annular recess, with a view to sealing the said area located around the aperture of the membrane in the metal of the rod extruded in the pasty state in the annular recess and pressing the membrane in a sound area between the rounded edge peripheric lip of the transmitting member and the counter-piece which constitutes them the the extension of the transmitting member on the other membrane surface.

The invention has also for its subject-matter a device for transmitting the motion obtained from the working up of the aforementioned method, this device, which includes a transmitting motion metal member passing through an aperture made in the membrane inflexion area, being characterized in that the transmitting motion member is a body of revolution substantially cylindrical having a diameter notably greater than the diameter of the hole of the membrane and showing, in the crossing area of the said membrane, a circular cut enclosing the bordering area of the concerned hole the bordering area of which is downed into the constitutive metal of the transmitting organ.

In a profitable embodiment, the device is further characterized in that, in the area of the membrane aperture, the inside surface of the membrane is rested on a plane radial surface belonging to the cut of the transmitting member, whereas the external surface of the membrane engages the rounded edge of a circular lip and a plane radial bearing of the said cut.

The invention will be more readily understood from the following description of two embodiments of the invention, examples illustrated in the appended drawing, on which:

Figure 1:
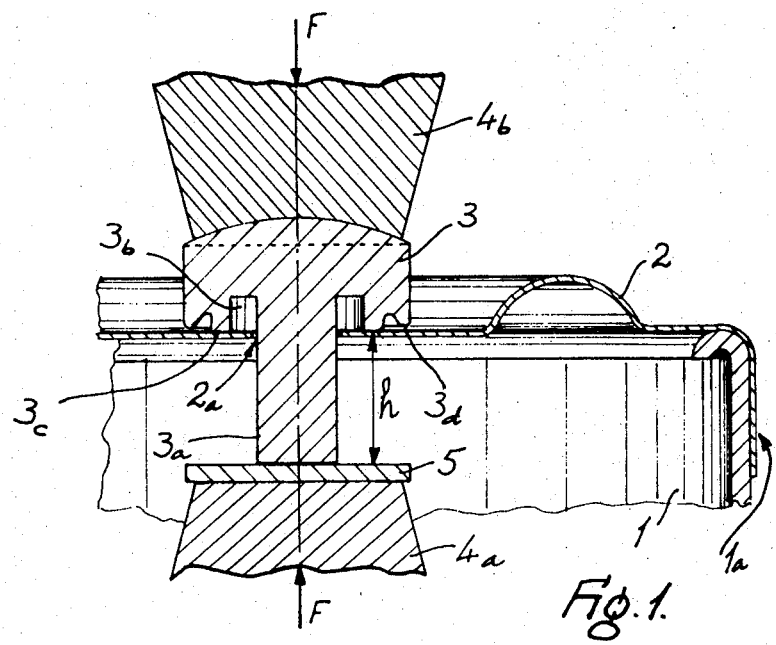
FIG. 1 shows an axial cross-section representing, before the forging operation, the shape and arrangement of the different parts of a transmitting motion device for hermetical microswitch of a type actuated by an axial translation motion.

On FIG. 1, the rigid metal casing 1 of an hermetical microswitch (of a type actuated by an axial translation motion) is capped by a distortable membrane 2 pressed in a thin foil of high resilience stainless metal. The tight connection between the membrane 2 and the wall of the cylindrical casing 1 is obtained in 1a by a weld bead made, for instance, through the electrical resistance welding process called "rotatable knurled nuts." In the centre of the membrane 2 is pierced an aperture 2a into which is freely inserted, with a small clearance, the axial rod 3a of a metal pusher 3 (which constitutes the transmitting motion organ) the shoulder of which engaging the external surface of the membrane 2 shows successively and concentrically an annular recess 3b, a circular, plane and confined bearing 3c and a rounded circular bearing, or lip, 3d the tangent plane of which is slightly retreated relative to the plane of bearing 3c. The respective dimensions of the rod 3a and recess 3b are such that the volume of the projecting part, length of which is $h$, of the rod $3a$ is substantially equal to the volume of the annular recess $3b$.

On the end of the rod $3a$ is set a disc 5 made of a metal similar to those of the push rod 3 for instance stainless steel, then the set of pieces 3 and 5 is clamped between electrodes $4a$ and $4b$ of an electrical resistance welding machine.

Under the combined action of continuous pressing and heating due to an electric current, the intensity and time of which are convenient, is realized the hot forging of the rod $3a$ the metal of which, at the pasty state, extrudes from an interstice $2a$ delimited by the periphery of the rod and the edge of membrane hole and fills entirely the annular recess $3b$ confining quite hermetically the bordering area, bended by the metal flow, of the membrane hole 2.

Figure 2:
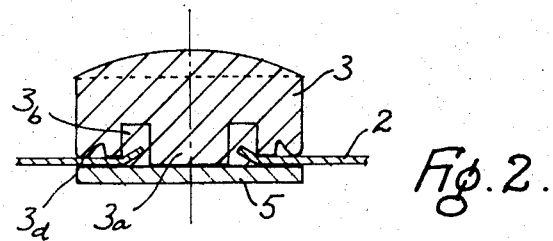
FIG. 2 is an axial cross-section showing the device of the FIG. 1 after the forging operation.

The pressure between electrodes $4a$ and $4b$ is kept sufficient to obtain permanently (see FIG. 2) by a slight crushing of the bearing $3c$, a strong grip of the membrane between the thrust disc 5 and the rounded annular bearing $3d$ of the pusher 3, in an area of the membrane which, having not been overheated at the time of forging (since the operating time is only a fraction of a second), has kept intact the resilient qualities required to resist to working by cyclic bending stresses it will have to endure during use.

Figure 3:
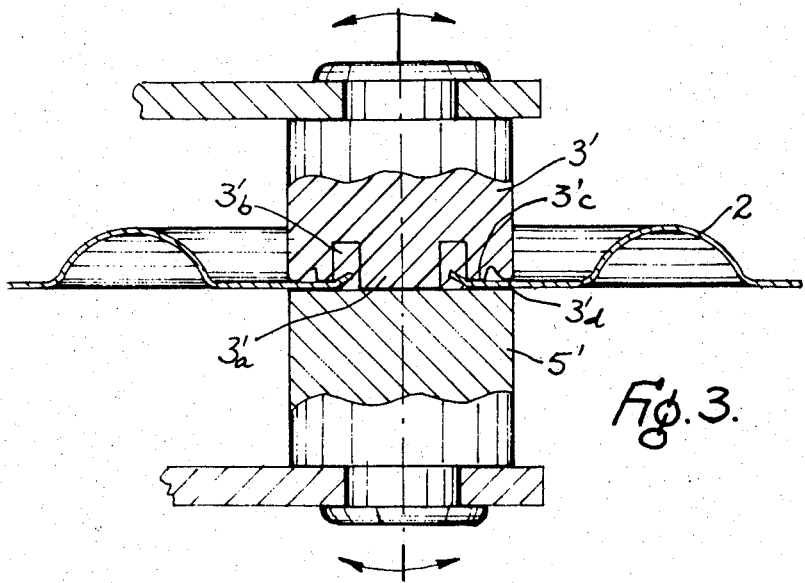
FIG. 3 is an axial cross-section similar to FIG. 2, of an alternative embodiment of the transmitting motion device for an hermetical microswitch of a type actuated by oscillatory motion.

On FIG. 3 is shown an alternative embodiment of the transmission system applied to an electrical switch of a type actuated by oscillatory motion.

On the said FIG. 3, a metal transmission organ has been designed by 3', which includes an axial rod $3'a$ concentrically to which are located an annular recess $3'b$, a circular bearing $3'c$ and a rounded edge lip $3'd$.

The disc 5 of the preceding example is here replaced by a cylindrical block 5' which is an extension of the transmitting organ 3'.

What I claim is:

1. A process to realize a tight motion transmitting system through a thin metal membrane comprising the steps consisting in: making an aperture in the center of inflexion of the thin metal membrane which must be crossed by a transmitting motion metal member; inserting freely, with a small clearance in said aperture, a cylindrical axial rod provided on said metal member, having, around the rod, a shoulder intended to engage the external face of the membrane and presenting, concentrically to the aforesaid rod, an annular recess, the volume of which substantially corresponds to the volume of the part of the axial rod exceeding the internal face of the membrane, a plane annular bearing intended to come in support on the external area of the membrane and, finally a rounded edge annular lip intended to come opposite and slightly retreated from the external area of the membrane; applying on the free end of said axial rod the plane surface of a counter-piece made of same metal that the metallic transmitting member, and axially pressing the metal transmittinng member and counter-piece between the electrodes of an electrical resistance welding machine, so that the plane surface of the counter-piece attached to the axial rod extrudes, due to the combined action of pressure and heat, the pasty metal from the said axial rod and from the area located around the membrane aperture, inside the annular recess with a view to sealing the said area located around the membrane aperture in the metal of the rod extruded, at the pasty state, in the annular recess and pressing the membrane in a sound area located between the rounded edge peripheric lip of the transmitting member and the counter-piece which thus constitutes the projection of the transmission member on the other side of the membrane.

2. In a tight motion transmitting system through a thin metal membrane, as obtained according to the process of claim 1 and comprising a metal transmitting motion member passing across an aperture in the inflexion area of the membrane, the fact that said transmitting motion member is a body of revolution substantially cylindrical the diameter of which is notably greater than the diameter of the membrane aperture and showing, in the crossing area of said membrane a circular cut enclosing the bordering area of the said aperture the bordering area of which is drowned into the constitutive metal of the transmitting organ.

3. A tight motion transmitting system according to claim 2, wherein the internal face of the membrane is laying, in the aperture area of the membrane, on a plane radial surface of the transmitting organ cut, whereas the external face of the membrane engages the rounded edge circular lip and a plane radial bearing of the said cut.

References Cited
UNITED STATES PATENTS 1,004,795  10/1911  Lachman.
2,677,741  5/1954  Martin.

JOSEPH V. TRUHE, Primary Examiner

J. G. SMITH, Assistant Examiner

U.S. Cl. X.R.

200—168; 219—107, 117